United States Patent Office 3,798,258
Patented Mar. 19, 1974

3,798,258
SALICYLANILIDES
Arthur A. Patchett, Cranford, Helmut Mrozik, Matawan, and Dale R. Hoff, Basking Ridge, N.J., assignors to Merck & Co., Inc., Rahway, N.J.
No Drawing. Continuation-in-part of application Ser. No. 634,442, Apr. 28, 1967, which is a continuation-in-part of application Ser. No. 573,474, Aug. 10, 1966, which in turn is a continuation-in-part of application Ser. No. 555,694, June 7, 1966, all now abandoned. This application Mar. 13, 1970, Ser. No. 19,487
Int. Cl. C07c *103/30*
U.S. Cl. 260—479 R
10 Claims

ABSTRACT OF THE DISCLOSURE

Salicylanilides having an aromatic ring linked to the aniline moiety by one or more non-metallic atoms. Processes for the preparation of novel salicylanilides. Compositions useful in the treatment of parasitic diseases containing a substituted salicylanilide as an active ingredient.

This application is a continuation-in-part of our application Ser. No. 634,442, filed Apr. 28, 1967 now abandoned, which latter application is a continuation-in-part of our application Ser. No. 573,474, filed Aug. 10, 1966, now abandoned, which in turn is a continuation-in-part of application Ser. No. 555,694, filed June 7, 1966, now abandoned.

DESCRIPTION OF THE PREFERRED EMBODIMENTS

This invention relates to a novel class of chemical compounds described as salicylanilides. More specifically, it relates to novel salicylanilides which carry an aromatic ring on the anilide moiety linked thereto through one or more non-metallic atoms. Furthermore, it relates to novel salicylanilides useful in the treatment of parasitic diseases, to methods of preparing and using them, and to compositions containing them.

The novel salicylanilides of the present invention are structurally depicted as follows:

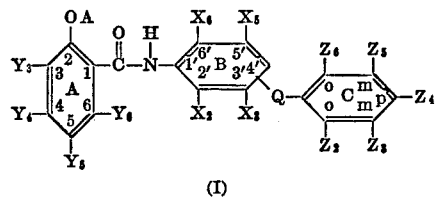

(I)

wherein

A is hydrogen or loweralkanoyl containing 2–4 carbon atoms, such as acetyl, propionyl or butyryl;
$Y_3$ is hydrogen, halogen, such as bromine, chlorine, iodine or fluorine, cyano, nitro, loweralkyl containing 1–4 carbons such as methyl, ethyl and butyl;
$Y_4$ is hydrogen or trifluoromethyl;
$Y_5$ is hydrogen, halogen, or nitro;
$Y_6$ is hydrogen, halogen, hydroxy, loweralkoxy containing 1–4 carbons, such as methoxy, ethoxy, and butoxy, or loweralkanoyloxy containing 2–4 carbons, such as acetoxy, propionyloxy, or butyryloxy;
$X_2$ is hydrogen, hydroxy, halogen, nitro, trifluoromethyl, or loweralkoxy containing 1–4 carbons, such as methoxy, ethoxy, or butoxy;
$X_3$ is hydrogen, halogen, trifluoromethyl, nitro, amino, or loweralkoxy containing 1–4 carbons, such as methoxy, ethoxy, or butoxy;
$X_3$ is hydrogen, halogen, trifluoromethyl, nitro, amino, or loweralkoxy containing 1–4 carbons, such as methoxy, ethoxy, or butoxy;
$X_5$ is hydrogen or halogen;
$X_6$ is hydrogen or halogen;
Q is oxygen or sulfur;
$Z_2$ is hydrogen, halogen, or loweralkyl containing 1–4 carbons;
$Z_3$ is hydrogen, halogen, trifluoromethyl, loweralkyl containing 1–4 carbons, such as methyl, ethyl, or butyl, or cyano;
$Z_4$ is hydrogen, halogen, cyano, nitro, trifluoromethyl, loweralkyl containing 1–4 carbons, such as methyl, ethyl, or butyl, or loweralkoxy containing 1–4 carbons;
$Z_5$ is hydrogen, halogen, or trifluoromethyl; and
$Z_6$ is hydrogen or halogen;
provided that Ring C is linked to Ring B at either the 3 or 4 position of Ring B, and that no more than three substituents other than hydrogen are present on any one of the aromatic rings at any one time, i.e., at least one of X, Y and Z is hydrogen. The term "halogen" is intended to include bromine, chlorine, iodine and fluorine. Where Ring C is attached to Ring B at the 3′ position, the substituent $X_3$ is in the 4′ position.

Also within the scope of the present invention are the pharmaceutically acceptable replacement or amine addition salts of Compound I, such as metal salts, exemplified by sodium, potassium, calcium, copper, iron, and the like, and amine salts such as the pyridine, piperazine, methylamine, ethanolamine salts, and the like. It is also contemplated that the novel salicylanilides of this invention can be employed in combination with other known, non-antagonistic anthelmintic agents such as thiabendazole, tetramisol, organo phosphorous compounds, piperazine, phenothiazine, certain antimony compounds, or with certain antibacterial agents such as the sulfonamides, certain penicillin preparations, certain antibiotics, and the like. The type of combination to be employed would depend upon the type and degree of infection to be combatted and the mode of administration.

As can be seen from the foregoing structural formula, the compounds of the present invention are tricyclic in which each ring is variously substituted. Those compounds wherein Q is either oxygen or sulfur, namely the phenoxy-salicylanilides and phenylthiosalicylanilides, and X, Y and Z are halogen, hydroxy, nitro or trifluoromethyl represent a preferred subclass of the compounds of the present invention. Also within the scope of the present invention are the sulfinyl and sulfonyl salicylanilides which can be prepared from those compounds where Q is sulfur by techniques known in the art. The point of attachment between the anilide ring moiety B and the nuclear ring moiety can be at a carbon either para or meta to the nitrogen or the anilide, i.e., at the 3 or 4 position of Ring B. The para position is the preferred point of attachment.

Typical of the compounds within the scope of the present invention wherein the total substituents other than hydrogen in Rings B and C is 0 or 1 are:

3,5-dibromo-4′-phenoxysalicylanilide
3,5-dichloro-4′-phenoxysalicylanilide
3,5-diiodo-4′-phenoxysalicylanilide
3,5-dibromo-4′-(m-trifluoromethylphenoxy)-salicylanilide
3,5-dibromo-4′-(p-methoxyphenoxy)-salicylanilide
3,5-dichloro-4′-(m-ethoxyphenoxy)-salicylanilide
3,5-dichloro-4′-(m-ethoxyphenoxy)-salicylanilide
3,5-dibromo-4′-(p-nitrophenoxy)-salicylanilide
3,5-diiodo-4′-(o-nitrophenoxy)-salicylanilide
3,5-dibromo-4′-(p-cyanophenoxy)-salicylanilide
3,5-dibromo-4′-(p-bromophenoxy)-salicylanilide
3,5-dichloro-4′-(p-bromophenoxy)-salicylanilide
3,5-dibromo-4′-(p-chlorophenoxy)-salicylanilide
3,5-dichloro-4′-(p-chlorophenoxy)-salicylanilide
3,5-diiodo-4′-(o-chlorophenoxy)-salicylanilide 3,5-dibromo-4'-(o-bromophenoxy)-salicylanilide
3,5-dibromo-3'-chloro-4'-phenoxysalicylanilide
3,5-dichloro-4'-chloro-3'-phenoxysalicylanilide
3,5-dibromo-3'-chloro-4'-phenoxysalicylanilide,
3,5-dibromo-4'-(m-bromophenoxy)-salicylanilide and
3,5-dibromo-4'-(p-fluorophenoxy)-salicylanilide.

Representative of the compounds of the present invention wherein the total number of substituents other than hydrogen in Rings B and C is 2 are:

3,5-dibromo-3'-trifluoromethyl-4'-(p-chlorophenoxy)-salicylanilide
3,5-dibromo-4'-(p-chloro-m-methylphenoxy)-salicylanilide
3,5-dichloro-3'-trifluoromethyl-4'-(p-chlorophenoxy)-salicylanilide
3,5-dibromo-4'-(p-chloro-m-ethylphenoxy)-salicylanilide
3-bromo-3'-chloro-4'-(p-chlorophenoxy)-salicylanilide
3,5-dibromo-3'-chloro-4'-(p-chlorophenoxy)-salicylanilide
3,5-diiodo-3'-chloro-4'-(p-chlorophenoxy)-salicylanilide
3,5-difluoro-3'-chloro-4'-(p-chlorophenoxy)-salicylanilide
3,5-dibromo-3'-bromo-4'-(p-bromophenoxy)-salicylanilide
3,5-dichloro-3'-chloro-4'-(p-chlorophenoxy)-salicylanilide
3,5-dibromo-3'-chloro-4'-(m-bromophenoxy)-salicylanilide
3,5-dibromo-3'-chloro-4'-(o-chlorophenoxy)-salicylanilide
3,5-dibromo-3',5'-dichloro-4'-phenoxysalicylanilide
3,5,6-tribromo-3'-chloro-4'-(p-chlorophenoxy)-salicylanilide
3,3',5,6-tetrachloro-4'-(p-chlorophenoxy)-salicylanilide
2-acetoxy-3'-chloro-4'-(p-chlorophenoxy)-3,5-diiodobenzanilide
3,5-dibromo-3'-chloro-4'-(p-chlorophenoxy)-6-hydroxysalicylanilide, 5-nitro-3'-chloro-4'-(p-chlorophenoxy)-salicylanilide
3-bromo-5-nitro-3'-chloro-4'-(p-chlorophenoxy)-salicylanilide
3-bromo-5-nitro-3'-bromo-4'-(p-bromophenoxy)-salicylanilide
3-chloro-5-nitro-3'-chloro-4'-(p-chlorophenoxy)-salicylanilide
3-bromo-5-nitro-3'-fluoro-4'-(p-fluorophenoxy)-salicylanilide
3-nitro-5-bromo-3'-chloro-4'-(p-chlorophenoxy)-salicylanilide
3-nitro-5-chloro-3'-chloro-4'-(p-chlorophenoxy)-salicylanilide
3-nitro-5-bromo-3'-bromo-4'-(p-bromophenoxy)-salicylanilide
3,5-diiodo-3'-chloro-4'-(p-chlorophenoxy)-salicylanilide
3,5-dibromo-2'-chloro-4'-(p-chlorophenoxy)-salicylanilide, and
3,5-dibromo-4'-(m,p-dichlorophenoxy)-salicylanilide.

The compounds of the present invention wherein the total substituents other than hydrogen in Rings B and C is 3 or more are represented by the following:

3,5-dibromo-3'-chloro-4'-(p-chloro-m-methylphenoxy)-salicylanilide
3,5-dibromo-3'-chloro-4'-(p-chloro-m-butylphenoxy)-salicylanilide
3,5-dibromo-3'-methoxy-4'-(m,p-dichlorophenoxy)-salicylanilide
3,5-dibromo-3'-propoxy-4'-(m,p-dichlorophenoxy)-salicylanilide
3,5-dibromo-4'-(o,o,p-trichlorophenoxy)-salicylanilide
3,5-dibromo-3',5',6'-trichloro-4'-(o,o,p-trichlorophenoxy)-salicylanilide
3,5-dichloro-3'-chloro-4'-(o,p-dichlorophenoxy)-salicylanilide
3,5-dibromo-3'-chloro-4'-(m,p-dichlorophenoxy)-salicylanilide
3,5-diiodo-3'-chloro-4'-(m,p-dichlorophenoxy)-salicylanilide
3,5-dibromo-3'-chloro-4'-(o,o,p-trichlorophenoxy)-salicylanilide
3,5-dibromo-3',5'-dichloro-4'-(p-chlorophenoxy)-salicylanilide, and
3,5-dibromo-2',5'-dichloro-4'-(p-chlorophenoxy)-salicylanilide.

The foregoing represents a partial representative list of various phenoxy compounds of the present invention wherein the phenoxy moiety is positioned para to the amide nitrogen atom of the anilide, that is, in the 4' position of the B Ring. The 3' isomers are also contemplated within the scope of the invention and may be represented by:

3,5-dibromo-4'-chloro-3'-(p-chlorophenoxy)-salicylanilide
3,5-dichloro-4'-chloro-3'-(p-chlorophenoxy)-salicylanilide
3,5-dichloro-4'-bromo-3'-(p-bromophenoxy)-salicylanilide
3-bromo-5-nitro-4'-chloro-3'-(p-chlorophenoxy)-salicylanilide
3-nitro-5-bromo-4'-chloro-3'-(p-chlorophenoxy)-salicylanilide
3,5-dibromo-4'-chloro-3'-(o,p-dichlorophenoxy)-salicylanilide
3,5-dibromo-4'-chloro-3'-(o,o,p-trichlorophenoxy)-salicylanilide
3,5-dibromo-4',5'-dichloro-3'-(m,p-dichlorophenoxy)-salicylanilide
3,5-dibromo-4'-chloro-3'-(m-trifluoromethylphenoxy)-salicylanilide, and
3,5-dibromo-6-hydroxy-4'-chloro-3'-(p-chlorophenoxy)-salicylanilide.

Representative of the compounds of the present invention wherein Q in Formula I is sulfur are those compounds listed above having the oxygen of the phenoxy moiety replaced by a sulfur atom, or sulfinyl or sulfonyl, and further exemplified by:

3,5-dibromo-4'-(p-nitrophenylthio)-salicylanilide
3,5-dibromo-3'-chloro-4'-(p-nitrophenylthio)-salicylanilide
3,5-dibromo-3'-chloro-4'-(p-nitrophenylthio)-salicylanilide
3,5-dichloro-3'-methyl-4'-(p-nitrophenylthio)-salicylanilide
3,5-dibromo-4'-(p-bromophenylthio)-salicylanilide
3,5-dibromo-3'-bromo-4'-(p-bromophenylthio)-salicylanilide
3,5-dibromo-3'-chloro-4'-(p-chlorophenylthio)-salicylanilide
3,5-dichloro-3'-chloro-4'-(m-methoxy-p-chlorophenylthio)-salicylanilide
3,5-dibromo-4'-(p-bromophenylsulfonyl)-salicylanilide
3,5-dibromo-3'-chloro-4'-(p-chlorophenylsulfonyl)-salicylanilide
3,5-dibromo-3'-chloro-4'-(p-chlorophenylsulfinyl)-salicylanilide
3,5-dibromo-3'-trifluoromethyl-4'-(p-nitrophenylsulfonyl)-salicylanilide
3,5-dibromo-4'-(p-nitrophenylsulfonyl)-salicylanilide
3,5-dibromo-6-hydroxy-4'-(p-fluorophenylthio)-salicylanilide
3,5-dibromo-4'-(p-fluorophenylthio)-salicylanilide
3,5-dibromo-4'-(m-trifluoromethylphenylthio)-salicylanilide and the like.

The preferred compounds among the foregoing are:

3,5-dibromo-3'-chloro-4'-(p-chlorophenoxy)-salicylanilide
3,5-dibromo-3'-chloro-4'-(o,p-dichlorophenoxy)-salicylanilide
3-nitro-5-bromo-3'-chloro-4'-(p-chlorophenoxy)-salicylanilide
3,5-dibromo-3'-bromo-4'-(p-bromophenoxy)-salicylanilide
3,5-dibromo-6-hydroxy-4'-chloro-3'-(p-chlorophenoxy)-salicylanilide
3,5-dibromo-2'-chloro-4'-(p-chlorophenoxy)-salicylanilide
3,5-dibromo-6-hydroxy-4'-(p-fluorophenylthio)-salicylanilide
3,5-dibromo-4'-(m,p-dichlorophenoxy)-salicylanilide salicylanilide
3,5-dibromo-4'-(m-trifluoromethylphenoxy)-salicylanilide
3,5-dibromo-2',5'-dichloro-4'-(p-chlorophenoxy)-salicylanilide
3,5-dibromo-4'-(p-fluorophenylthio)-salicylanilide, and
3,5-dibromo-4'-(m-trifluoromethylphenylthio)-salicylanilide.

The compounds of the present invention are prepared by condensing an appropriately substituted salicyclic acid compound containing an activating group in the carboxylic acid sidechain (Compound II) with an aniline compound substituted at the 3 or 4 position with a second aromatic ring, said rings being joined together by an oxygen or sulfur atom, with optional substitution on the remaining carbon atoms of each of the aromatic rings, hereinafter referred to as a substituted aniline compound (Compound III) as shown by the following flow diagram:

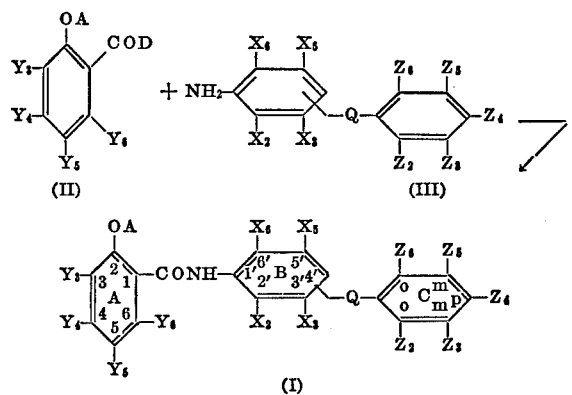

where D is an activating group such as chlorine or bromine; A equals hydrogen or loweralkanoyl; and $X_2$—$X_7$, $Y_3$—$Y_6$, $Z_2$—$Z_6$ and Q are as defined above, provided that Ring B is linked to Ring C at either the 3 or 4 position of Ring B.

The activated salicyclic acid compound can also be reacted with an appropriately substituted aniline compound in the presence of a Lewis acid such as boron trifluoride or alkali such as sodium hydroxide or just with heating, depending upon the type of activating group on the salicyclic acid compound.

Where the activating group is halogen, one can also first react the acid halide with ammonia to form the amide, and then react the amide with a substituted aniline in the presence of a suitable alkali. By "appropriately substituted" is meant that those substituents Y, X and Z, which are desired in the final product (Compound I), are present in the reagent Compounds II and III.

Where the acid halide is reacted directly with the substituted aniline, the reaction is carried out in the presence of a solvent via in situ formed acid halide. This may be achieved by combining the free acid with the amine and preferably a stoichiometric amount of a halogenating agent such as thionyl chloride, thionyl bromide, phosphorous trichloride, phosphorous oxychloride, phosphorous tribromide, phosphorous pentachloride, phosphorous pentabromide, oxalylchloride, silicon tetrachloride, and the like. The temperature of the reaction is not critical, suitable results being obtained at temperatures ranging from room temperature to the reflux temperature of the reaction mass. It is preferred, however, to conduct the reaction at elevated temperatures (since room temperature reactions may be uneconomical and the time consuming) and most preferably at the reflux temperature of the system. As suitable solvents there may be employed aromatic compounds such as benzene, toluene, xylene; halogenated aromatic compounds such as chlorobenzene and dichlorobenzene; halogenated hydrocarbons such as chloroform, tetrachloroethane, carbon tetrachloride, methylene chloride; ethers such as dioxane, diethylether, dimethoxyethane; and the like. Halogenated aromatic solvents are preferred with chlorobenzene being most preferred. The final product is obtained in solution and may be recovered by filtration where crytallization has already occurred, or the entire mixture may be filtered and the filtrate concentrated to the point of crystallization or by other techniques known in the art.

The reaction may also be carried out by first forming the acid chloride of the substituted salicyclic acid compound by refluxing the acid in a solvent such as benzene, toluene, or xylene with a halogenating agent such as thionyl chloride, oxalyl chloride, or phosphorus trichloride. The solvent is then removed before reacting the acid halide with the amine. Any suitable method may be employed, such as distillation in vacuo, particularly for the lower boiling solvents. The residue is then redissolved in the same solvent and the solution is added to a stirred mixture of the substituted aniline in an alkaline solution employing, for example, sodium hydroxide. The addition is generally carried out slowly to ensure the presence of excess alkali. After the addition of acid chloride is complete, the reaction mixture is generally stirred for an additional period of from 30–60 minutes to ensure complete reaction. The pH of the solution is then made neutral or barely acidic with a dilute acid such as hydrochloric acid, and the solid which separates is filtered off and purified by techniques known to those skilled in the art.

In order to maximize yields of Compounds I, it may be desirable in some cases to protect the phenol group of Compound II to eliminate the possibility of interaction between the acid halide group of one molecule of Compound II with the unprotected phenol group of another or with that of the product. This may be achieved by acylating Compound II before use, using preferably acetylation with, for example, acetic anhydride.

Illustrative of the salicyclic acid compounds that may be employed are:

3,5-dibromo salicylic acid
3,5-dichloro salicylic acid
3,5-diiodo salicylic acid
3-nitro-5-bromo-salicylic acid
3-bromo-5-nitro-salicylic acid
3-nitro salicylic acid
3-nitro-5-chloro salicylic acid
3,5,6-tribromo salicylic acid
3,5,6-trichloro salicylic acid
3,5-dibromo-6-hydroxy salicylic acid
5-nitro salicylic acid
3-trifluoromethyl-5-bromo salicylic acid
o-acetyl-3,5-dibromo salicylic acid
5-iodo-3-nitro salicylic acid
4-trifluoromethyl salicylic acid, and the like. Representative of the amines which may be employed are:

4-aminobiphenyl ether
4-amino-3'-trifluoromethyl biphenylether
4-amino-4'-methoxybiphenyl ether 4-amino-3'-ethoxybiphenyl ether
4-amino-4'-nitrobiphenyl ether
4-amino-2'-nitrobiphenyl ether
4-amino-4'-cyanobiphenyl ether
4-amino-4'-bromobiphenyl ether
4-amino-4'-chlorobiphenyl ether
4-amino-2'-chlorobiphenyl ether
4-amino-2'-bromobiphenyl ether
4-amino-2-chlorobiphenyl ether
4-amino-4'-fluorobiphenyl ether
4-amino-3'-iodobiphenyl ether
4-amino-2-trifluoromethyl-4'-chlorobiphenyl ether
4-amino-3'-methyl-4'-chlorobiphenyl ether
4-amino-2,4'-chlorobiphenyl ether
4-amino-2,4'-bromobiphenyl ether
4-amino-2-chloro-3'-bromobiphenyl ether
4-amino-2,4'-dichloro-3'-methylbiphenyl ether
4-amino-2,4'-dichloro-3'-propylbiphenyl ether
4-amino-2-methoxy-3',4'-dichlorobiphenyl ether
4-amino-2-ethoxy-3',4'-dichlorobiphenyl ether
4-amino-2,2'-dichloro-4'-methylthiobiphenylether
4-amino-2',4',6'-trichlorobiphenyl ether
4-amino-2,2',4'-trichlorobiphenyl ether
4-amino-2,2',4'-tribromobiphenyl ether
4-amino-2,2',4',6'-tetrachlorobiphenyl ether
4-amino-4'-bromobiphenyl thioether
4-amino-4'-nitrobiphenyl thioether
4-amino-1-(p-bromobenzenesulfonyl)-benzene
4-amino-1-(p-nitrobenzenesulfonyl)-benzene
4-amino-1-(p-bromobenzenesulfinyl)-benzene
4-amino-1-(p-nitrobenzenesulfinyl)-benzene
4-aminobiphenyl ketone
5-amino-2,4'-dichlorobiphenyl ether
5-amino-2,4'-dichlorobiphenyl thioether
5-amino-2,4'-dibromobiphenyl ether
4-amino-3',4'-dichlorobiphenyl ether
4-amino-2,4',5-trichlorobiphenyl ether
4-amino-4'-fluorobiphenyl sulfide
4-amino-3,4'-dichlorobiphenylether
4-amino-3'-trifluoromethylbiphenyl sulfide, and
3-amino-3'-trifluoromethylbiphenyl ether.

The amine reactants of Formula III wherein Q is S or O and in which the phenoxy or phenylthio group is para to the amine nitrogen atom (such compounds hereafter designated Compounds IV-a) are prepared in a series of reactions depicted in the following flow diagram:

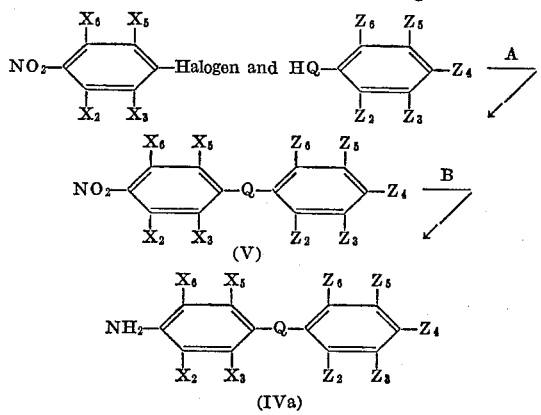

in which $X_2$–$X_6$, $Z_2$–$Z_6$ and Q are as previously defined.

As can be seen from the above, the process for producing the Compounds IV(a) involves condensing, in Step A, an appropriately substituted p-halonitrobenzene with an appropriately substituted phenol or thiophenol. The condensation product is a diphenyl ether or diphenyl thioether which is next reduced, in Step B, to convert the nitro group thereof to the amino group. It will be noted that the phenoxy or phenylthio group in Compounds IV(a) is positioned para to the amine nitrogen atom. Such compounds when used in the preparation of Compounds I will yield what has been heretofore referred to as the 4'-isomer. Where the meta position of Q relative to the amino group in Compound III is desired, a modification of the above procedure, as more specifically shown hereinafter, is effective to achieve such a result.

More particularly, Step A of the above procedure involves reacting the p-halonitrobenzene with the phenol or thiophenol in a fusion reaction. The fusion itself involves heating the reactants to their molten state, optionally in the presence of a catalyst such as metallic copper, cuprous chloride, cupric chloride, and the like. The reaction must be carried out in the presence of a base such as potassium hydroxide, sodium hydroxide, sodium hydride, sodium methoxide, potassium carbonate, sodium carbonate, potassium bicarbonate, sodium bicarbonate, or the like. Solvents may be employed, if desired, and suitable results are obtained with dimethylformamide, dimethylsulfoxide, biphenylether, ethanol, methanol, and the like. A convenient temperature for either a fusion or solution reaction is in the range of from 25°–300° C. The nitrodiphenyl product of the reaction is obtained as a solid and may be recrystallized in accordance with well-known techniques.

Step B in the preparation of Compounds IV(a) contemplates reducing the nitrodiphenyl compounds from Step A (Compound V) to convert the nitro group thereof to the amino group. Any process capable of reducing nitro groups may be employed provided due consideration is given to maintaining the rest of the molecule intact. For example, catalytic reductions using hydrogen and Raney nickel or platinum may be employed. Chemical reductions using metals such as iron or zinc in the presence of acids may also be used. Catalytic hydrogenations are preferred and are conveniently run at room temperature at a hydrogen pressure of from about 20 to 100 p.s.i.g. Where any of X and Z are reducible groups such as nitro or cyano, for example, selective reduction of the desired group may be achieved by known techniques, as for example, by employing only one equivalent of hydrogen or by using mild reducing agents such as hydrogen sulfide or salts thereof.

To obtain Compounds IV wherein the point of attachment of Q is meta to the amino group, Compounds IV(a) are subjected to a series of reactions, the effect of which is to introduce an amino group or a group which can be converted to an amino group at the appropriate position. In general, this is achieved by blocking the amino group of Compound IV(a) with an acyl group using, for example, acetic anhydride, nitrating the compound with a suitable nitrating system, for example, an acetic anhydride-nitric acid system, then removing the acyl group by hydrolysis with, for example, sodium hydroxide, potassium hydroxide, or the like, then diazotizing the free amine, and reductively eliminating the resulting diazo group, all in a manner known in the art. The newly introduced nitro group is then reduced to the amino group in the manner described for Step B above and is then available for reaction with the salicylic acid Compound II. The phenylthiosalicylanilides can be converted to the corresponding phenylsulfonylsalicylanilides and phenylsulfinylsalicylanilides.

Compounds V or Compounds I wherein Q is sulfur are oxidized by techniques well known in the art for converting sulfides to sulfinyl or sulfonyl groups, as, for example, by using hydrogen peroxide, chromic acid, or potassium permanganate or the like.

The compounds of the present invention have utility in the field of animal therapy. They are effective anthelmintics and are especially effective against both mature and immature liver fluke of the species Fasciola gigantica and Fasciola hepatica, the common liver fluke in sheep and cattle. Many of the compounds of the invention also possess activity against nematodes and particularly against Haemonchus contortus of sheep, and some of the compounds show marked activity against migrating ascarids in swine. This is especially true of the compounds wherein Y is nitro. For example, the antiascarid activity of 3-nitro - 5 - bromo-3'-chloro-4'-(p-chlorophenoxy)-salicylanilide at the migratory stages of *Ascaris suum* in swine shows a maked reduction in lung pathology, and the number of larvae reaching the lungs during the initial stage of infection. For effective treatment, certain dosage levels are desired depending upon the compound employed, the type of animal to be treated, and the particular helminth being combatted. In general, effective fluke efficacy is achieved when the compound is administered in a single dose at dosage levels of from about 1 to 300 mg./kg. of animal body weight, and preferably from about 2 to 50 mg./kg. of animal body weight. The compounds of the present invention may be administered in a variety of ways, depending upon the particular animal employed, the type of anthelmintic treatment normally given to such an animal, the materials employed, and the particular helminths being combatted. It is preferred to administer them in a single efficacious oral or parenteral, most preferably oral, dose at a time when fluke or nematode infection is apparent or suspected. They may be employed alone or in combination with other anthelmintics, parasiticides or antibacterials.

In general, compositions containing the active anthelmintic compound are employed; the amounts of the anthelmintic ingredient in the composition, as well as the remaining constituents varying according to the type of treatment to be employed, the host animal, and the particular parasitic disease being treated. In general, however, compositions containing a total weight percent of the active compound or compounds ranging from 0.001 to 95% will be suitable with the remainder being any suitable carrier or vehicle. Furthermore, the compositions should contain enough of the active compound to provide an effective dosage for the proper treatment of the parasitic disease.

A number of modes of treatment may be employed, and each to some extent determines the general nature of the composition. For example, the anthelmintic compounds may be administered to domesticated animals in a single unit oral dosage form such as a tablet, bolus, capsule or drench; in a liquid oil base form suitable for parenteral administration; or they may be compounded as a feed premix to be later admixed with the animal's food.

When the compositions are to be solid unit dosage forms as in tablets, capsules, or boluses, the ingredients other than the active compounds may be any other pharmaceutically acceptable vehicles convenient in the preparation of such forms, and preferably materials nutritionally suitable such as starch, lactose, talc, magnesium stearate, vegetable gums, and the like. Moreover, when capsules are employed, the active compound may be used in essentially undiluted form, the only extraneous material being that of the capsule casing itself which may be hard or soft gelatin material. When the dosage form is to be used for parenteral administration, the active material is suitably admixed with an acceptable oil base vehicle, preferably of the vegetable oil variety, such as peanut oil, cottonseed oil, and the like. In all of such forms, i.e., in tablets, boluses, capsules, and oil base formulations, the active compound ordinarily ranges from about 5 to 80% by weight of the total composition.

When the unit dosage form is to be in the form of a drench, the anthelmintic agents may be mixed with agents which will aid in the subsequent suspending of the active compound in water, such as bentonite, clays, water soluble starches, cellulose derivatives, gums, surface active agents and the like to form a dry predrench composition, and this predrench composition added to water just before use. In the predrench formulation, in addition to the suspending agent, such ingredients as preservatives, antifoam compounds, and the like may be employed. Such a dry product may contain as much as 95% by weight of the active compound, the rest being contributed by the excipients. Preferably, the solid composition contains from 30% to 95% by weight of the active compound. Enough water should be added to the solid product to provide the proper dosage level within a convenient amount of liquid for a single oral dose. The commonly used measure in the field is one fluid ounce of material and thus one fluid ounce of material should contain enough of the anthelmintic compound to provide the effective dosage level. Liquid drench formulations containing from about 10 to 30 weight percent of dry ingredients will in general be suitable with the preferred range being from 15 to 50 weight percent.

Where the compositions are intended to be used as feeds, feed supplements or feed premixes, they will be mixed with suitable ingredients of an animals nutrient ration. The solid orally ingestible carriers normally used for such purposes, such as distillers' dried grains, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like are all suitable. The active compounds are intimately dispersed or admixed throughout the solid inert carrier by methods such as grinding, stirring, milling or tumbling. By selecting proper diluents and by altering the ratio of carrier to active ingredient, compositions of any desired concentration may be prepared. Feed supplement formulations containing from about 10 to 30% by weight of active ingredient are particularly suitable for addition to feeds. The active compound is normally dispersed or mixed uniformly in the diluent but in some instances may be adsorbed on the carrier.

These supplements are added to the finished animal feed in an amount adequate to give the final concentration desired for controlling or treating the helminth infection by way of the animal ration. Although the preferred level in feeds will depend on the particular compounds being employed, the active compounds of this invention are normally fed at levels of 0.05–25% in the feed. As stated above, animals are preferably treated at a time when the infestation is apparent or suspected and the most preferred method for such treatment is via the single oral dose technique. Thus, administration of medicated feed is not preferred but may certainly be employed. Similarly, the amounts of drug present in the feed may be reduced to levels in the order of 0.001% to 3.0 weight percent based on the weight of feed, and the medicated feed administered over prolonged periods. This would be in the nature of a preventive or prophylactic measure but again is not the mode of choice. Another method of administering the compounds of this invention to animals whose feeds are conveniently pelleted, such as sheep, is to incorporate them directly in the pellets. For instance, the anthelmintic compound is readily incorporated in nutritionally adequate alfalfa pellets at levels of 2 to 110 grams per pound of pellets for therapeutic use, and at lower levels for prophylactic use, and such pellets fed to the animals.

In addition to their use in the treatment of helminthiasis, the salicylanilides which are the subject of this invention are active antibacterial agents and, in particular, are effective against *Staphylococcus aureus*, *Staphylococcus albus*, *Streptococcus faecalis*, *Escherichia coli*, *Pseudomonas aeruginosa*, and *Proteus vulgaris*. The salicylanilides of this invention may be used in the treatment of a wide range of skin conditions. Although they exhibit marked topical activity per se, they can be employed as an additive in such preparations as soaps, germicides, deodorants, household disinfectants, dust powders, skin creams, medicated lotions, and cosmetics. The high activity against *Staphylococcus aureus* is of considerable interest, since this organism is comon on the skin and is associated with many wound infections. The range of activity is wide and includes gram positive and gram negative organisms and some fungi. Although the halogenated salicylanilides may be used as a component of creams and powders, etc., it is also contemplated that they may be incorporated into the formulations of antiseptic aerosol products.

The following examples are given for the purpose of illustration and not by way of limitation:

EXAMPLE 1

3,5-dibromo-3'-chloro-4'-(p-chlorophenoxy)-salicylanilide

This example is illustrative of the general procedure for obtaining the salicylanilides of the present invention wherein Q in Compound I is para to the amino nitrogen atom.

(a) 2-chloro-4-nitrophenyl-p-chlorophenyl ether.—A mixture of 108 g. (0.842 mole) of p-chlorophenol, 58 g. of potassium hydroxide is stirred mechanically in a one-liter three-neck flask equipped with a thermometer until a homogeneous solution is obtained. During this time, about 10 minutes, the temperature is observed to rise to about 90° C. Then 90 g. of a 173 g. (0.901 mole) portion of 3,4-dichloronitrobenzene. is added and the temperature raised carefully to ca. 120° C. An exothermic reaction begins which causes the temperature of the reaction mixture to increase to 150° C. The temperature is allowed to fall to 120° C. again and the remaining 83 g. of the dichloronitrobenzene added. The mixture is heated slowly to 130° C., the exothermic reaction again begins, and causes the temperature to increase to about 150° C. The reaction mass is cooled to 110° C., then 250 ml. of water is added quickly with vigorous stirring, to obtain a crystalline precipitate. The mixture is filtered, washed with water and the solid then dissolved in 800 ml. of boiling ethanol. The solution is boiled down until crystallization starts. The ether is obtained as yellow crystals, 142 g., M.P. 105°–107° C. Upon recrystallization from boiling ethanol, 136 g. of 2-chloro-4-nitrophenyl-p-chlorophenyl ether, M.P. 106°–108° C., are obtained.

(b) 4-amino-2-chlorophenyl-p-chlorophenyl ether.— The 136 g. of 2-chloro-4-nitrophenyl-p-chlorophenyl ether obtained in step a. is hydrogenated at room temperature at 40 lbs. hydrogen pressure in 800 ml. of ethanol with 4 teaspoons of Raney nickel until the theoretical amount of hydrogen is taken up (8 hours).

The catalyst is removed by filtration and the solvent is stripped off completely under high vacuo giving 132 g. of a brown oil which solidifies to a grey solid, M.P. 72°–74° C. This is used without further preparation for the next step.

(c) 3,5-dibromo-3'-chloro-4'-(p-chlorophenoxy)-salicylanilide.—62.3 g. (0.245 mole) of 4-amino-2-chlorophenyl ether and 72.5 g. (0.245 mole) of 3,5-dibromo salicylic acid are suspended in 725 ml. of chlorobenzene and stirred mechanically. 8.6 ml. of phosphorus trichloride is added in a slow stream. The mixture is heated to boiling and refluxed for three hours, filtered hot, and concentrated in vasue to ca. 450 ml. A thick slurry forms which is allowed to come to room temperature, aged 2 hour, filtered and washed with petroleum benzin. It is dried in vacuo at 50° C. for 24 hours, giving 98 g. of crude product, M.P. 163°–165° C. On recrystallization from a mixture of benzene-petroleum benzin, 85 g. of pure 3,5 - dibromo - 3' - chloro-4'-(p-chlorophenoxy)-salicylanilide, M.P. 164°–166° C., are obtained.

EXAMPLES 2–6

The general procedure of Example 1 is followed using equivalent amounts of p-chloronitrobenzene in place of 3,4-dichloronitrobenzene in step a. with the phenols shown in the table below to produce the corresponding ether which is then reduced in accordance with step (b) to produce the amino compound shown in the table. This amino compound is reacted with 3,5-dibromosalicylic acid in accordance with step (c) to produce the salicylanilide shown.

| Ex. | Phenol compound | Ether | Salicylanilide | Melting point, °C. |
| --- | --- | --- | --- | --- |
| 2 | Phenol | 4-aminophenyl-phenylether. | 3,5-dibromo-4'-phenoxysalicylanilide. | 152–153 |
| 3 | m-Trifluoromethylphenol. | 4-aminophenyl-m-trifluoromethylphenylether. | 3,5-dibromo-4'-(m-trifluoromethylphenoxy)-salicylanilide. | 115–117 |
| 4 | p-Methoxyphenol. | 4-aminophenyl-p-methoxyphenylether. | 3,5-dibromo-4'-(p-methoxyphenoxy)-salicylanilide. | 198.5–200 |
| 5 | p-Cyanophenol. | 4-aminophenyl-p-cyanophenylether. | 3,5-dibromo-4'-(p-cyanophenoxy)-salicylanilide. | 225–227 |
| 6 | p-Nitrophenol. | 4-aminophenyl-p-nitrophenylether. | 3,5-dibromo-4'-(p-nitrophenoxy)-salicylanilide. | 214–216 |

When the above procedures are repeated using, in place of the phenols described, the corresponding thiophenols, there are obtained the corresponding thioethers which are converted to the corresponding phenylthio salicylanilides.

EXAMPLES 7–17

3,5-dibromo-3'-chloro-4'-(p-chloro-m-methylphenoxy)-salicylanilide

A mixture of 45 g. (0.17 mole) of 4-amino-2,4'-dichloro-3'-methylbiphenyl ether, 48.6 g. of 3,5-dibromosalicylic acid (0.17 mole) and 6.1 ml. (0.07 mole) of phosphorus trichloride in 1000 ml. of chlorobenzene is stirred and refluxed for three hours. The reaction mixture is filtered hot through a sintered glass funnel. The filtrate is then concentrated on a steam bath under vacuum of about 15 to 20 mm. of mercury to remove solvent. The product is then recrystallized from benzene yielding 33 g. of 3,5-dibromo-3'-chloro-4'-(p-chloro-m-methylphenoxy)-salicylanilide; M.P. 173°–174° C.

When the above procedure is repeated using equivalent amounts of the ether compound shown below in place of the 4-amino-2,4'-dichloro-3'-methylbiphenylether, the indicated salicylanilide is obtained.

| Ex. | Ether | Salicylanilide | Melting point, °C. |
| --- | --- | --- | --- |
| 8 | 4-aminophenyl-p-bromophenylether. | 3,5-dibromo-4'-(p-bromophenoxyl)-salicylanilide. | 172–173 |
| 9 | 4-aminophenyl-p-chlorophenylether. | 3,5-dibromo-4'-(p-chlorophenoxy)-salicylanilide. | 166–168 |
| 10 | 4-aminophenyl-o-chlorophenylether. | 3,5-dibromo-4'-(o-chlorophenoxy)-salicylanilide. | 161–162 |
| 11 | 4-aminophenyl-o-bromophenylether. | 3,5-dibromo-4'-(o-bromophenoxy)-salicylanilide. | 170–171 |
| 12 | 4-amino-2-chloro-diphenylether. | 3,5-dibromo-3'-chloro-4'-phenoxy)salicylanilide. | 148–149 |
| 13 | 4-aminophenyl-bromophenylether. | 3,5-dibromo-4'-(m-bromophenoxy)-salicylanilide. | 158–160 |
| 14 | 4-aminophenyl-p-fluorophenylether. | 3,5-dibromo-4'-(p-fluorophenoxy)-salicylanilide. | 129–130 |
| 15 | 4-amino-2-trifluoromethylphenyl-p-chlorophenylether. | 3,5-dibromo-3'-trifluoromethyl-4'-(p-chlorophenoxy)-salicylanilide. | [1] 85–87 |
| 16 | 4-aminophenyl-m-methyl-p-chlorophenylether | 3,5-dibromo-4'-(m-methyl-p-chlorophenoxy)-salicyl. anilide. | 149–150 |
| 17 | 4-amino-2-methoxyphenyl-m,p-dichlorophenylether. | 3,5-dibromo-3'-methoxy-4'-(m,p-dichlorophenoxy)-salicylanilide. | 183–184 |

[1] As etherate.

The ethers used in Examples 7–17 are prepared in accordance with the procedure of Example 1 a. and b. and Example 2 using equivalent amounts of the appropriate halonitrobenzene and substituted phenol in place of the 3,4-dichloronitrobenzene and the p-chlorophenol, respectively. The corresponding thioethers can be used to make the phenylthio salicylanilides.

EXAMPLES 18–22

3,3′,5-trichloro-4′-(p-chlorophenoxy)-salicylanilide

A mixture of 25.4 g. (0.1 mole) of 4-amino-2,4′-dichlorobiphenyl ether, 20.7 g. (0.1 mole) of 3,5-dichlorosalicylic acid, and 3.5 ml. of phosphorus trichloride in 300 ml. of chlorobenzene is stirred and refluxed for three hours. It is filtered hot and the filtrate cooled in an ice bath for three hours. The resulting crystals are filtered and washed with petroleum benzin to give 32 g. of product, M.P. 159°–162° C. It is recrystallized three times from benzene to give 16.1 g. of 3,3′,5-trichloro-4′-(p-chlorophenoxy)-salicylanilide, M.P. 161.5°–162.5° C.

The above procedure is repeated using equivalent amounts of the reactants shown below to produce the salicylanilide indicated:

| Ex. | Salicylic acid compound | Ether compound | Salicylanilide | Melting point, °C. |
|---|---|---|---|---|
| 19 | 3-bromosalicylic acid. | 4-amino-2-chlorophenyl-p-chloro-phenyl ether. | 3-bromo-3′-chloro-4′-chlorophenoxy)-salicylanilide. | 201–202 |
| 20 | 3,5,6-tribromosalicylic acid. | 4-amino-2-chlorophenyl-p-chlorophenyl ether. | 3,5,6-tribromo-3′-chloro-4′-(p-chlorophenoxy)-salicylanilide. | 234–235 |
| 21 | 3,5,6-trichlorosalicylic acid. | 4-amino-2-chloro-4-phenyl-p-chlorophenyl ether. | 3,5,6-trichloro-3′-chloro-4′-(p-chlorophenoxy)-salicylanilide. | 211–212 |
| 22 | 3,5-dibromo-6-hydroxysalicylic acid. | 4-amino-2-chlorophenyl-0-chloro-m-methylphenyl ether. | 3,5-dibromo-6-hydroxy-3′-chloro-4′-(p-chloro-m-methylphenoxy)-salicylanilide. | [1] 202 |

[1] Decomposes.

EXAMPLE 23

3,5-dibromo-6-hydroxy-3′-chloro-4′-(p-chlorophenoxy-salicylanilide

A mixture of 13.8 g. (0.09 mole) of 2,6-dihydroxybenzoic acid, 22.7 g. (0.09 mole) of 4-amino-2,4′-dichlorobiphenyl ether and 3.0 ml. of phosphorus trichloride in 215 ml. of chlorobenzene is stirred and refluxed for 3 hours. Upon standing at room temperature, the product crystallizes out of the reaction mixture. Recrystallization from a mixture of ethyl acetate and benzene yields 17.9 g. of 3′-chloro-4′-p-chlorophenoxy-6-hydroxy salicylanilide, M.P. 204°–206° C.

3.9 g. (0.01 mole) of 3′-chloro-4′-(p-chlorophenoxy)-6-hydroxy salicylanilide is dissolved in 200 ml. of ether. 3.19 g. (1.02 mole, 0.02 mole) of bromine is added dropwise at room temperature with stirring. After the addition of bromine is complete, the reaction mixture is cooled in an ice bath, and the crude product settles out of the ether solution. Recrystallization from benzene yields 4.5 g. of 3,5-dibromo-6-hydroxy-3′-chloro-4′-(p-chlorophenoxy)-salicylanilide, M.P. 187°–188° C., dec.

EXAMPLE 24

3,5-dibromo-6-hydroxy-4′-chloro-3′-(p-chlorophenoxy)-salicylanilide

A mixture of 6.05 g. of 2,6-dihydroxy benzoic acid, 10.0 g. of 5-amino-2,4′-dichlorobiphenyl ether, and 1.35 ml. of phosphorus trichloride in 100 ml. of chloro benzene is refluxed for 3 hours. Upon standing at room temperature, the crude product settles out of the reaction mixture. Recrystallization from a mixture of benzene-ethyl acetate yields 10.3 g. of 6-hydroxy-4′-chloro-3′-(p-chlorophenoxy-salicylanilide, M.P. 199°–202° C.

10.03 g. of 6-hydroxy-4′-chloro-3′-(p-chlorophenoxy)-salicylanilide is dissolved in 620 ml. of ether. 2.68 ml. of bromine is added dropwise, at room temperature with stirring. Upon addition of 300 ml. of a mixture of petroleum benzin, the crude product settles out. Recrystallization from ether-petroleum benzin yields 1.0 g. of 3,5-dibromo-6-hydroxy-4′-chloro-3′-(p-chlorophenoxy)-salicylanilide, M.P. 171°–173° C., dec.

EXAMPLE 25

4-amino-4′-fluorodiphenyl sulfide

A solution of 30 g. of 4-fluoro-4′-nitrodiphenylsulfide in 300 ml. of ethanol is reduced at room temperature with hydrogen and 2.5 g. of Raney nickel catalyst under 40 pounds of pressure. After the theoretical amount of hydrogen is absorbed, the catalyst is reduced by filtration, and the filtrate is concentrated in vacuo to an oil, which solidifies on standing. After pulverizing the solid in a mortar and washing with petroleum benzin, 24 g. of substantially pure 4-amino-4′-fluorodiphenyl sulfide, M.P. 63°–65° C., are obtained.

EXAMPLE 26

3,5-dibromo-4′-(p-fluorophenylthio)-salicylanilide

A mixture of 24.3 g. of 4-amino-4′-fluorodiphenylsulfide, 32.8 g. of 3,5-dibromo salicylic acid, and 3.9 ml. of phosphorus trichloride in 340 ml. of chloro benzene is refluxed for 3 hours. The mixture is filtered while still hot, and the filtrate is concentrated to a small volume until crystallization occurs. 50 cc. of petroleum benzin are added to complete the crystallization. Upon recrystallization of the crude product from methanol, 43 g. of 3,5 - dibromo-4′-p-fluorophenylthio salicylanilide, M.P. 154°–157° C., are obtained.

EXAMPLE 27

3,5-dibromo-4′-(p-fluorophenylthio)-6-methoxy salicylanilide

A mixture of 5.0 g. of 6-methoxy salicylic acid, 6.52 g. of 4-amino-4′-fluorodiphenyl sulfide, and 1.56 ml. of phosphorus trichloride in 105 ml. of chlorobenzene is stirred at room temperature for 30 minutes after which it is refluxed for 3 hours. The reaction mixture is allowed to cool to room temperature and is concentrated in vacuo to an oil. The oil is crystallized from 60 ml. of ethanol to afford 4′-(p-fluorophenylthio)-6-methoxy salicylanilide, M.P. 109°–110° C.

1·0 g. of 4′-(p-fluorophenylthio)-6-methoxysalicylanilide is dissolved in 15 ml. of warm glacial acetic acid. A solution of 0.3 ml. of bromine in 2 ml. of glacial acetic acid is added at 65° C. After all of the bromine is consumed, the reaction mixture is poured onto ice, and the solid formed is collected by filtration. Upon recrystallization from ether-petroleum benzin, pure 3,5-dibromo-4′-(p - fluorophenylthio)-6-methoxy salicylanilide, M.P. 112°–113° C. is obtained.

EXAMPLE 28

3,5-dibromo-6-hydroxy-4′-(p-fluorophenylthio)-salicylanilide

A mixture of 23.0 g. (0.149 mole) of 2,6-dihydroxybenzoic acid, 32.6 g. (0.149 mole) of 4-amino-4′-fluorobiphenyl sulfide, and 5.2 ml. of phosphorus trichloride in 450 ml. of chloro benzene is refluxed for 3 hours. Upon standing at room temperature, the crude product settles out of the reaction mixture. The crystals are filtered off, and recrystallization from methanol yields 34.4 g. of 6-hydroxy-4′-(p-fluorophenylthio)-salicylanilide, M.P. 169°–172° C.

5.0 g. of 6-hydroxy-4′-(p-fluorophenylthio)-salicylanilide is dissolved in 250 ml. of ether. 1.44 ml. of bromine is added dropwise with stirring. The solution is then concentrated in vacuo to an oil. The oil is dissolved in 55 ml. of benzene from which crystallizes upon cooling 2.1 g. of 3,5-dibromo - 6 - hydroxy-4′-(p-fluorophenylthio)-salicylanilide, M.P. 167° C., dec.

EXAMPLE 29

3,5-diiodo-3′-chloro-4′-(p-chlorophenoxy)-salicylanilide

A mixture of 31.0 g. of 4-amino-2,4′-dichlorobiphenyl ether, 47.4 g. of 3,5-diiodo salicylic acid, and 4.3 ml. of phosphorus trichloride in 235 ml. of chloro benzene is refluxed for 3 hours. The hot solution is decanted from some insoluble residue and the crude product settles out of solution upon cooling to room temperature. Upon recrystallization from benzene, 27.8 g. of 3,5-diiodo-3'-chloro-4'-(p-chlorophenoxy)-salicylanilide, M.P. 168°–170° C. is obtained.

EXAMPLE 30

3,3',5-tribromo-4'-(p-bromophenoxy)-salicylanilide

A mixture of 18.4 g. (0.0534 mole) of 4-amino-2,4'-dibromobiphenyl ether, 15.8 g. (.053 mole) of 3,5-dibromo salicylic acid and 1.82 ml. of phosphorus trichloride in 150 ml. of chlorobenzene is stirred and refluxed for three hours. It is filtered hot and the filtrate cooled to room temperature overnight. Green crystals form which are filtered. The filtrate is washed with 2.5 N hydrochloric acid (25 ml.) and 25 ml. of a saturated sodium chloride solution. The organic layer is dried over magnesium sulfate solution, concentrated to a solid mass which is combined with the first crop. The solid is recrystallized twice from benzene, treated with charcoal, and recrystallized four times from benzene to yield 12 g. of 3,3',5-tribromo-4' - (p - bromophenoxy) - salicylanilide, M.P. 185°–186° C.

EXAMPLE 31

3,5-dibromo-3'-chloro-4'-(o,p-dichlorophenoxy)-salicylanilide

A mixture of 38.2 g. (0.132 moles) of 4-amino-2,2',4'-trichlorobiphenyl ether, 39.1 g. (0.132 mole) of 3,5-dibromo salicylic acid and 4.5 ml. phosphorus trichloride in 350 ml. of chlorobenzene is stirred and refluxed for three hours. It is filtered hot and the filtrate cooled at room temperature for two hours. White crystals (40 g.) are obtained which are recrystallized three times from benzene and twice from ethanol to yield 23.9 g. of 3,5-dibromo - 3' - chloro - 4' - (o,p-dichlorophenoxy)-salicylanilide, M.P. 149°–151° C.

EXAMPLE 32

3,5-dibromo-3'-chloro-4'-(m,p-dichlorophenoxy)-salicylanilide

A mixture of 37.5 g. (0.13 moles) of 4-amino-2,3',4'-trichlorobiphenyl ether, 37.2 g. (0.13 mole) of 3,5-dibromo salicylic acid and 4.4 ml. of phosphorus trichloride in 400 ml. of chlorobenzene is stirred and refluxed for three hours. It is filtered hot and the filtrate cooled to yield white crystals. It is recrystallized twice from benzene yielding 32 g. of 3,5-dibromo-3'-chloro-4'-(m,p-dichlorophenoxy)-salicylanilide, M.P. 193.5°–194.5° C.

EXAMPLE 33

5-bromo-3-nitro-3'-chloro-4'-(p-chlorophenoxy)-salicylanilide

A mixture of 33.3 g. (0.132 mole) of 4-amino-2,4'-dichlorobiphenyl ether, 34.4 g. (0.132 mole) of 5-bromo-3-nitro salicylic acid and 4.5 ml. (0.0513 mole) of phosphorus trichloride in 350 ml. of chlorobenzene is stirred and refluxed for three hours in a one-liter flask. It is filtered hot and the filtrate allowed to cool and concentrate to a dark oil. 25 ml. of benzene is added and allowed to stand overnight. The crystals are filtered and washed twice with benzene over a sintered glass funnel. They are then recrystallized once from ethanol and then dissolved in 75 ml. of dimethylformamide and 25 ml. of water to which 250 ml. of ethanol is added. This is then heated until complete solution occurs. The solution is then cooled slowly to room temperature and then in ice until crystallization is complete. It is filtered, washed with ethanol and dried in vacuo at 50° C. to yield 42.0 g. of 5 - bromo - 3 - nitro - 3' - chloro-4'-(p-chlorophenoxy)-salicylanilide, M.P. 150°–152° C.

Using equivalent amounts of 5-nitro salicylic acid or 3-bromo-5-nitro salicylic acid in place of the 5-bromo-3-nitro salicylic acid in the foregoing procedure results in 5 - nitro - 3'-chloro-4'-(p-chlorophenoxy)-salicylanilide (M.P. 200–202° C.) or 3-bromo - 5 - nitro - 3'-chloro-4' - (p - chlorophenoxy) - salicylanilide (M.P. 213–214° C.), respectively.

EXAMPLE 34

3,5-dibromo-4'-chloro-3'-(p-chlorophenoxy)-salicylanilide

This example is intended to be illustrative of a procedure for the preparation of those salicylanilides of the present invention wherein Q in Formula I is meta to the amide nitrogen. Example 1 (a) and (b) is repeated to produce 4 - amino-2-chlorophenyl-p-chlorophenyl ether. The ether so produced (10 g.) is then acetylated with 10 ml. of benzene and 6.5 ml. of acetic anhydride by stirring at room temperature for 15 minutes. It is then cooled and the product allowed to crystallize. Filtration gives 12 g. of 4-acetylamino-2,4'-dichlorobiphenyl ether, M.P. 142–143° C. 10 g. of this product is suspended in 100 ml. acetic anhydride and cooled to 0° C. It is then nitrated by dropwise addition of a solution of 5.35 ml. of concentrated nitric acid and 1.78 ml. of acetic anhydride with vigorous stirring while the tempearture is maintained at 0° C. After the addition is complete, it is stirred for an additional hour at 0° C. It is then poured into 300 ml. of ice water and the product allowed to crystallize. Filtration gives 6.6 g. of 4-acetylamino-2,4'-dichloro-5-nitrobiphenyl ether, M.P. 132–136° C. This is recrystallized twice from ethanol to give 4 g. with a melting point of 145°–146° C.

1 g. of the nitro compound so produced is boiled in 10 ml. of ethanol on the steam bath. A solution of 0.75 g. of potassium hydroxide in 2 ml. of water is added. It is heated for 15 minutes on the steam bath. The product is allowed to crystallize at room temperature, is filtered, and washed with 30% aqueous ethanol to give 750 mg. of 4-amino-2,4'-dichloro-5-nitrobiphenyl ether, M.P. 186°–188° C.

A solution of 0.6 g. of the above product in 75 ml. of ethanol and 3.2 ml. of concentrated sulfuric acid is refluxed with vigorous stirring. To the resulting solution is added a solution of 3.05 g. of sodium nitrite in 7 ml. of water as rapidly as the gas evolution allows. Reflux is continued for one hour after the addition is complete. The reaction is filtered hot and the filtrate is concentrated in vacuo to about 25 ml. It is then diluted with water until crystallization starts. The 2,4'-dichloro-5-nitrobiphenyl ether is recrystallized from ethanol, then from petroleum benzin ether to a melting point of 93° C. The product is hydrogenated in accordance with the procedure set forth in Example 1(b). The so obtained crude 5-amino-2,4'-dichlorobiphenyl ether is used without purification for the next step.

A mixture of 9 g. of the above obtained amine, 12.6 g. of dibromo salicylic acid and 1.45 ml. of phosphorus trichloride in 150 ml. of chlorobenzene is stirred and refluxed for three hours. It is filtered hot and then concentrated to oil. This is crystallized from benzene and recrystallized from aqueous ethanol to give 11 g. of 3,5-dibromo - 4' - chloro - 3' - (p - chlorophenoxy)-salicylanilide, M.P. 165–167° C.

When the above procedure is repeated using equivalent amounts of any of the phenol compounds or phenylthio compounds hereinbefore described in place of p-chlorophenol and using equivalent amounts of any of the halonitrobenzenes hereinbefore described in place of the 3,4-dichloronitrobenzene, the corresponding salicylanilide having the Q of Formula I attached meta to the amide nitrogen atom is obtained.

EXAMPLE 35

3,5-dibromo-4'-(p-bromobenzenesulfonyl)-salicylanilide

A mixture of 28.2 g. of 4-amino-4'-bromobiphenyl sulfone, 25.8 g. of 3,5-dibromo salicylic acid and 2.5 ml. of phosphorous trichloride in 300 ml. of chlorobenzene is refluxed with vigorous stirring for three hours. The hot solution is filtered and concentrated until crystallization starts. The crystals are filtered and recrystallized from dimethylformamide to give 47 g. of 3,5-dibromo-4'-(p-bromobenzenesulfonyl)-salicylanilide, M.P. 283–285° C. dec.

When the foregoing procedure is repeated using equivalent amounts of any of the salicylic acid compounds hereinbefore described in place of the 3,5 - dibromo salicylic acid, the corresponding benzene sulfonyl salicylanilide is obtained.

The corresponding sulfinyl compounds are obtained by repeating the above procedure using the appropriate biphenyl sulfoxide in place of the biphenyl sulfone.

EXAMPLE 36

Rats are experimentally infected with the sheep liver fluke *Fasciola hepatica* and kept on a normal diet. The infection is allowed to proceed on a natural course for 12 weeks. The rats are then treated with a single oral dose of the compound shown in the table below as an aqueous suspension containing 2% methyl cellulose. The medicament is administered at a level of 300 mg./kg. of animal body weight. At the time of treatment, the animals weigh about 450 g. About 5 days after treatment the rats are necropsied and their bile ducts examined for the extent of infection. The results are summarized in the table below:

| Rat | Compound | Therapeutic response |
|---|---|---|
| 1 | 3,5-dibromo-4'-(p-bromphenoxy)-salicylanilide | Complete.[1] |
| 2 | 3,5-dibromo-3'-chloro-4'-phenoxy salicylanilide | Do.[1] |
| 3 | 5-nitro-3'-chloro-4'-(p-chlorophenoxy)-salicylanilide | Do.[1] |
| 4 | 3,5-dibromo-4'-(m-methyl-p-chlorophenoxy)-salicylanilide | Do.[1] |
| 5 | 3,5-dibromo-4'-(p-nitrophenoxy)-salicylanilide | Moderate.[2] |

[1] Designation given when all liver fluke present in bile duct are dead.
[2] Indicate some liver fluke present (alive).

EXAMPLE 37

Groups of three animals experimentally infected with the sheep stomach worm *Haemonchus contortus* are treated nine days after infection with a single oral dose of the compounds shown below in the form of an aqueous suspension in 2% methyl cellulose at the dosage levels shown. The hosts are sacrificed one day later and the stomach examined for presence of worms. The number found is compared to those in the groups retained as untreated controls and the efficacy expressed as percent reduction.

| Compound | Dosage, mg./kg. | Average number of worms | Percent reduction |
|---|---|---|---|
| 3-nitro-5-bromo-3'-chloro-4'-(p-chlorophenoxy)-salicylanilide | 12.5 | 27 | 58 |
|  | 50.0 | 0 | 100 |
| 3-bromo-5-nitro-3'-chloro-4'-(p-chlorophenoxy)-salicylanilide | 12.5 | 43 | 33 |
|  | 50.0 | 18 | 72 |
|  | 200.0 | 0 | 100 |
| Control group: |  |  |  |
| 1 |  | 0 | 63 |
| 2 |  | 0 | 65 |
| 3 |  | 0 | 60 |

EXAMPLE 38

Sheep experimentally infected with immature *F. hepatica* are treated with the compounds shown below at the dosage level indicated. Treatment is made orally four weeks after infection, i.e., at a time when the liver fluke are at the immature stage, using gelatin capsules containing the drug. The animals are sacrificed about nine weeks after treatment and their bile ducts and liver examined for the presence of live or dead fluke. The results are compared with those obtained on control groups receiving no medication:

| Drug | Dose rate, mg./kg. | Sheep number | Body weight, kg. | Liverfluke Live | Liverfluke Dead |
|---|---|---|---|---|---|
| 3,5-dibromo-3'-chloro-4'-(p-chlorophenoxy)-salicylanilide | 20 | 210 | 29 | 0 | 0 |
|  |  | 228 | 35 | 0 | 66 |
|  |  | 197 | 36 | 0 | 49 |
|  |  | 217 | 38 | 0 | 34 |
|  |  | 220 | 30 | 0 | 0 |
|  |  | 181 | 31 | 1 | 30 |
|  |  | 209 | 33 | 0 | 26 |
|  |  | 180 | 34 | 10 | 0 |
|  | 40 | 187 | 31 | 0 | 46 |
|  |  | 203 | 33 | 0 | 26 |
|  |  | 176 | 35 | 0 | 12 |
|  |  | 198 | 36 | 0 | 57 |
|  |  | 179 | 38 | 0 | 26 |
|  |  | 160 | 39 | 0 | 25 |
|  |  | 154 | 40 | 0 | 8 |
| 3,5-dibromo-4'-(p-bromophenoxy)-salicylanilide | 100 | 166 | 41 | 0 | 0 |
|  |  | 226 | 39 | 17 | 10 |
|  |  | 178 | 40 | 0 | 0 |
| Controls |  | 121 |  | 47 | 0 |
|  |  | 105 |  | 31 | 0 |
|  |  | 192 |  | 0 | 0 |
|  |  | 208 |  | 6 | 0 |

As can be seen from the above table, both compounds significantly reduce the number of live fluke in the treatment animals as compared to the control animals in which the fluke flourish. It will be noted that this effect is achieved on immature fluke which are extremely resistant and virtually non-responsive to known chemotherapeutics.

EXAMPLES 39–51

The procedure outlined in Example 24 is repeated using equivalent amounts of the reactants shown below to produce the salicylanilide indicated:

| Ex. No. | Salicylic acid compound | Amine compound | Salicylanilide | Melting point, ° C. |
|---|---|---|---|---|
| 39 | 3,5-dibromo-salicylic acid | 5-chloro-2-nitro-4(p-chlorophenoxy)-aniline | 5'-chloro-3,5-dibromo-2'-nitro-4'-(p-chlorophenoxy)-salicylanilide | 214-216 |
| 40 | do | 2-chloro-4-(p-chlorophenoxy)-aniline | 2'-chloro-3,5-dibromo-4'-(p-chlorophenoxy)-salicylanilide | 163-164 |
| 41 | do | 5-chloro-2-methoxy-4-(p-chlorophenox)-aniline | 5'-chloro-3,5-dibromo-2'-methoxy-4'-(p-chlorophenoxy)-salicylanilide | 223-225 |
| 42 | do | 5-chloro-2-hydroxy-4-(p-chlorophenoxy)-aniline | 5'-chloro-3,5-dibromo-2'-hydroxy-4'-(p-chlorophepoxy)-salicylanilide | 184-185 |
| 43 | do | 2-trifluoromethyl-4-(p-trifluoromethylphenoxy)-aniline | 3,5-dibromo-2'-trifluoromethyl-4'-(p-trifluoromethylphenoxy)-salicylanilide | 76-79 |
| 44 | do | 3-nitro-4-(m,p-dichlorophenoxy)-aniline | 3,5-dibromo-2'-nitro-4'-(m,p-dichlorophenoxy)-salicylanilide | 219-220 |
| 45 | do | 2-chloro-4-(o-methylphenoxy)-aniline | 2'-chloro-3,5-dibromo-4'-(o-methylphenoxy)-salicylanilide | 150-153 |
| 46 | do | 3-chloro-4-(p-chloro-m-cyanophenoxy)-aniline | 3'-chloro-3,5-dibromo-4'-(p-chloro-m-cyanophenoxy)-salicylanilide | 248-250 |
| 47 | do | 3-chloro-4-(m,m'-dichloro-p-methylphenoxy)-aniline | 3'-chloro-3,5-dibromo-4'-(m,m'-dichloro-p-methylphenoxy)-salicylanilide | 220-222 |
| 48 | do | 4-(p-trifluoromethylphenyl)-aniline | 3,5-dibromo-4'-(p-trifluoromethylphenyl)-salicylanilide | 158-159 |
| 49 | do | 4-(m,m'-ditrifluoromethylphenoxy)-aniline | 3,5-dibromo-4'-(m,m'-ditrifluoromethylphenoxy)-salicylanilide | 161-163 |
| 50 | do | 3-chloro-4-(p-chloro-m,m'-dimethylphenoxy)-aniline | 3'-chloro-3,5-dibromo-4'-(p-chloro-m,m'-dimethylphenoxy)-salicylanilide | 203-210 |
| 51 | 5-bromo-3-cyano-salicylic acid | 3-chloro-4-(p-chlorophenoxy)-aniline | 5-bromo-3'-chloro-3-cyano-4'-(p-chlorophenoxy)-salicylanilide | 238-240 |

EXAMPLE 52

3,5-dibromo-3'-chloro-4'-(p-chlorophenoxy)-salicylanilide 72.5 g. (0.25 mole) of 3,5-dibromo salicylic acid are refluxed with 55 ml. of thionylchloride for 2 hours in 350 ml. of benzene. The benzene and excess thionyl chloride are removed in vacuo and the residue is redissolved in 80 ml. of benzene. This benzene solution is then added over a 10-minute period to a vigorously stirred mixture of 62.3 g. (0.245 mole) of 4-amino-2-chlorophenyl-p-chlorophenyl ether in 250 ml. of 15% sodium hydroxide. The reaction mixture is stirred for 60 minutes after addition of the acid chloride is complete. The pH of the solution is adjusted to 6, and the crude prdouct settles out of solution. Upon recrystallization from benzene-petroleum naphtha, pure 3,5-dibromo-3'-chloro-4'-(p-chlorophenoxy)-salicylanilide, M.P. 164–166° C., is obtained.

EXAMPLE 53

3,5-dibromo-3'-chloro-4'-(p-chlorophenoxy)-salicylanilide

To a solution of 25.4 g. of (0.1 mole) of 3-chloro-4-(p-chlorophenoxy)-aniline in 150 ml. of o-dichlorobenzene is added 10.1 g. (0.1 mole) of triethylamine, followed by 5.11 g. of 0.03 mole) of phosphorous oxychloride with cooling. The mixture is stirred for 20 minutes at 20°–25° C., after which 29.6 g. (0.1 mole) of 3,5-dibromosalicylic acid are added, and the resulting solution is refluxed for 3 hours. The reaction mixture is then cooled, filtered, washed with water, and dried over sodium sulfate. The drying agent is removed by filtration, and the product is precipitated by the addition of n-hexane. Upon recrystallization from benzene, 3,5-dibromo-3'-chloro-4'-(p - chlorophenoxy)-salicylanilide, M.P. 173°–175° C., is obtained.

EXAMPLE 54

3,5-dibromo-3'-chloro-4'-(p-chlorophenoxy)-salicylanilide 5.6 ml. (0.06 mole) of phosphorous trichloride are added at room temperature to a solution of 32.5 g. (0.13 mole) of 3-chloro-4-(p-chlorophenoxy)-aniline in 400 ml. of chlorobenzene. The solution is allowed to stand for 10 minutes, after which it is refluxed for 4 hours or until all of the hydrogen chloride is evolved. The solution is cooled to room temperature, the insoluble material is filtered off, and the crude phosphorazo intermediate is obtained by concentration in vacuo. 5.54 g. (18.7 mmoles) of 3,5-dibromosalicylic acid are added to a solution of 5 grams (9.4 mmoles) of the phosphorazo intermediate in 50 ml. of chlorobenzene. The mixture is heated at 110° C. for 2½ hours, after which it is filtered and concentrated to 40 ml. The product crystallizes upon cooling, is collected by filtration, and after washing with cold chlorobenzene and petroleum ether, substantially pure 3,5-dibromo-3'-chloro-4'-(p-chlorophenoxy)-salicylanilide, M.P. 170°–173° C., is obtained.

EXAMPLE 55

In efficacy tests against mature, naturally occurring *F. heptaica* infections in sheep, the following compounds are administered as a single oral dose in a gelatin capsule. Efficacy is determined in the manner set forth in Example 37. The animals are sacrificed about a week after dosing. The dosage levels at which effective results are obtained is indicated:

| Compound | Dosage level, mg./kg. |
|---|---|
| 3,5-dibromo-3'-chloro-4'-(o,p-dichlorophenoxy)-salicylanilide | 20 |
| 3,5-dibromo-3'-chloro-4'-(p-chlorophenoxy)-salicylanilide | 20 |
| 3,5-dibromo-3'-chloro-4'-(m,p-dichlorophenoxy)salicylanilide | 20 |
| 3,5-dibromo-3'-chloro-4'-(m-bromophenoxy)-salicylanilide | 60 |
| 3,5-dibromo-3'-chloro-4'-(m-methyl-p-chlorophenoxy)-salicylanilide | 20 |
| 3,5-dibromo-4'-chloro-3'-(p-chlorophenoxy)-salicylanilide | 10 |
| 3,5-dibromo-3'-bromo-4'-(p-bromophenoxy)-salicylanilide | 60 |
| 3,5-dibromo-3'-chloro-4'-(p-chlorophenoxy)-salicylanilide | 20 |
| 3,5-dibromo-4'-(p-fluorophenoxy)-salicylanilide | 10 |
| 3-nitro-5-bromo-3'-chloro-4'-(p-chlorophenoxy)-salicylanilide | 5 |

Those substances within the purview of Formula I above wherein A represents an acyl radical such as lower-alkanoyl or aroyl have activity against liver fluke essentially equivalent to the nonacylated compounds. These acyl derivatives are obtained by reacting the appropriately substituted 2-acylbenzoyl chloride with the appropriately substituted 4-amino-biphenyl, or by acylating the salicylanilide with an acylating agent, such as acetic anhydride in pyridine. The 2-acyl benzoyl chloride having the Y substituent in the ring is obtained from the correspondingly substituted salicylic acid by acylating the free acid with an acid anhydride in the presence of a strong acid such as perchloric acid or sulfuric acid, and treating the resulting 2-acyloxy compound with, for example, thionyl chloride or phosphorous pentachloride to produce 2-acyloxy nuclearly substituted benzoyl chloride.

EXAMPLE 56

2-acetoxy-3'-chloro-4''-(p-chlorophenoxy)-3,5-dibromobenzanilide

A mixture of 31.3 g. (0.123 mole) of 4-amino-2,4'-dichlorobiphenyether and 90 ml. of anhydrous toluene is refluxed with stirring and a solution of 43.7 g. of 2-acetoxy-3,5-dibromobenzoylchloride in 125 ml. of toluene is added dropwise. After 6 hours of reflux the reaction mixture is allowed to cool to room temperature and then concentrated in vacuo to a brown oil. This is taken up in chloroform and washed with dilute hydrochloric acid and dilute sodium bicarbonate solution and again concentrated in vacuo to a brown oil. This is taken up in chloroform and washed with dilute hydrochloric acid and dilute sodium bicarbonate solution and again concentrated in vacuo to a brown oil. This is crystallized from a benzene-petroleum benzene mixture and then recrystallized twice from isopropanol, giving 33.5 g. of 2-acetoxy-3'-chloro-4'-(p-chlorophenoxy - 3,5 - dibromobenzanilide, M.P. 147–148° C.

When in the above process 2,6-dacetoxy-3,5-dibromobenzoyl chloride is used in place of 2-acetoxy-5-dibromobenzoyl chloride, there is obtained 2,6-diacetoxy-3'-chloro-4'-(p-chlorophenoxy)-3,5-dibromobenzanilide, M.P. 181–183° C.

EXAMPLE 57

3,5-dibromo-3'-chloro-4'-(p-bromo-m-trifluoromethylphenoxy)-salicylanilide

To a refluxing solution of 0.925 g. (0.00252 mole) of 4-amino-4'-bromo - 2 - chloro-3'-trifluoromethylbiphenyl ether in 5 ml. of toluene is added dropwise a solution of 0.899 g. (0.00252 mole) of 2-acetoxy-3,5-dibromobenzoyl chloride in 5 ml. of toluene with vigorous stirring. When addition is complete, refluxing is continued for a full six hours. The product is allowed to crystallize overnight and collected by filtration. The yield is 0.800 g. of crude 2 - acetoxy - 3,5 - dibromo-3'-chloro-4'-(p-bromo-m-trifluoromethylphenoxy)-benzanilide. This is immediately suspended in 9 ml. of ethanol and boiled on a steam bath. To the boiling reaction mixture is added a solution of 0.57 g. of potassium hydroxide in 3 ml. of water. Solution occurs immediately. While still warm, it is acidified with concentrated hydrochloric acid. A brown precipitate forms, which is collected by filtration and washed with water. The crude precipitate is crystallized several times from benzene-petroleum-benzene, giving brown crystals, M.P. 165°–168° C. The product is recrystallized from aqueous ethanol to give crystals having a M.P. of 168°–169° C.

It should be understood that although this invention has been described with reference to particular embodiments thereof, changes and modifications may be made which are within its intended scope, and it should be limited only by the language of the appended claims.

What is claimed is:
1. A compound of the formula

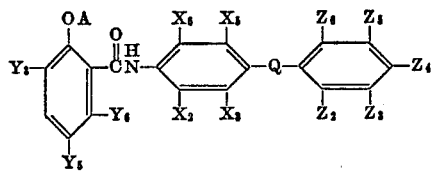

or

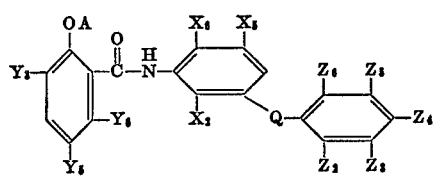

or a pharmaceutically acceptable salt thereof, wherein

A is hydrogen or loweralkanoyl containing 2–4 carbon atoms;
Q is sulfur;
$Y_3$ is halogen, cyano, or nitro;
$Y_5$ is halogen or nitro;
$Y_6$ is hydrogen, or hydroxy;
$X_2$ is hydrogen, halogen, nitro or trifluoromethyl;
$X_3$ is hydrogen, halogen, or trifluoromethyl;
$X_5$ is hydrogen or halogen;
$X_6$ is hydrogen or halogen, provided that at least two of $X_2$, $X_3$, $X_5$ and $X_6$ are hydrogen;
$Z_2$ is hydrogen or halogen;
$Z_3$ is hydrogen, halogen, trifluoromethyl, or loweralkyl containing 1–4 carbons;
$Z_4$ is hydrogen, halogen, nitro, trifluoromethyl, or loweralkyl containing 1–4 carbons;
$Z_5$ is hydrogen, halogen or trifluoromethyl; and
$Z_6$ is hydrogen or halogen, provided that at least two of $Z_2$, $Z_3$, $Z_4$, $Z_5$ and $Z_6$ are hydrogen.

2. A compound of the formula

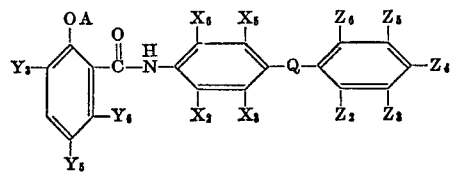

or a pharmaceutically acceptable salt thereof, wherein

A is hydrogen;
Q is sulfur;
$Y_2$ and $Y_5$ are halogen, $Y_6$ is hydrogen;
$X_2$, $X_3$, $X_5$ and $X_6$ are each hydrogen or halogen provided that at least two are hydrogen;
$Z_2$, $Z_3$, $Z_4$, $Z_5$ and $Z_6$ are each hydrogen or halogen provided that at least two are hydrogen.

3. The compound 3,5-dibromo-3'-trifluoromethyl-4'-(p-trifluoromethylphenoxy)-salicylanilide.

4. The compound 3,5-dibromo-4'-(3,5-di-trifluoromethylphenoxy)-salicylanilide.

5. The compound 3-nitro-5-bromo-4'-(p-chlorophenoxy)-salicylanilide.

6. The compound 3,5-dibromo-4'-(m-trifluoromethylphenoxy)-salicylanilide.

7. The compound 3,5-dibromo-6-hydroxy-4'-chloro-3'-(p-chlorophenoxy)-salicylanilide.

8. The compound of claim 1, which compound is 3,5-dibromo-6-hydroxy-4'-(p-fluorophenylthio)-salicylanilide.

9. The compound of claim 1, which compound is 3,5-dibromo-4'-(p-fluorophenylthio)-salicylanilide.

10. The compound of claim 1, which compound is 3,5-dibromo-4'-(m-trifluoromethylphenylthio)-salicylanilide.

References Cited
UNITED STATES PATENTS

| 3,674,850 | 7/1972 | Osborne | 260—559 |
| 3,147,300 | 9/1964 | Schraufstatter | 260—559 |
| 3,332,996 | 7/1967 | Zerweck et al. | 260—559 |

FOREIGN PATENTS

| 29,370 | 1/1966 | Greece | 260—559 |

HARRY I. MOATZ, Primary Examiner

U.S. Cl. X.R.

260—465 D, 544 M, 559 S, 571, 578, 607 R, 612 R; 424—304, 311, 324